United States Patent [19]

Sato

[11] 3,914,153
[45] Oct. 21, 1975

[54] METHOD OF AND APPARATUS FOR FUSION-BONDING THERMOPLASTIC TAPE IN STRAPPING MACHINE

[75] Inventor: Eiichi Sato, Hayama, Japan

[73] Assignee: Ogawa Hoso System Kabushiki Kaisha, Kodaira, Japan

[22] Filed: Dec. 18, 1973

[21] Appl. No.: 425,868

[30] Foreign Application Priority Data
Dec. 19, 1972 Japan................................ 47-128004

[52] U.S. Cl............ 156/499; 53/198 R; 100/33 PB; 156/530; 156/510
[51] Int. Cl.²..................... B65B 13/32; B32B 31/20
[58] Field of Search ........... 156/306, 499, 468, 502, 156/475, 507, 494, 512, 157, 530, 217, 543, 156/256, 583; 53/198 R; 100/33 PB; 140/93.2, 140/93.4; 219/243; 161/36, 38

[56] References Cited
UNITED STATES PATENTS

| | | | |
|---|---|---|---|
| 2,372,737 | 4/1945 | Phillips | 156/306 |
| 3,269,300 | 8/1966 | Billett et al. | 100/8 |
| 3,284,982 | 11/1966 | Conti | 156/522 |
| 3,306,003 | 2/1967 | Sundy et al. | 53/198 R |
| 3,470,814 | 10/1969 | Tschappu | 156/306 |

Primary Examiner—Douglas J. Drummond
Assistant Examiner—J. J. Gallagher

[57] ABSTRACT

A device for sealing together overlapping ends of a thermoplastic tape wrapped around an article in which the leading end of the tape and the trailing portion of the tape are heated to fusion temperature by inserting a heating means between the overlapping portions of the tape and then moving the heating means followed closely by a pressing means for applying pressure along a line transversely of the tape to bond the thermoplastic portions of the tape.

1 Claim, 6 Drawing Figures

METHOD OF AND APPARATUS FOR FUSION-BONDING THERMOPLASTIC TAPE IN STRAPPING MACHINE

DETAILED DESCRIPTION OF THE INVENTION

This invention relates to a method of and an apparatus for fusion-bonding the lapped end portions of a strapping tape made of a thermoplastic resin such as polypropylene after a certain length of said tape has been wound around an object in a strapping machine.

The known tape fusion-bonding systems used in the strapping machines include generally the following three methods: a vibration method in which a vibrator is disposed between the lapped portions of the strapping tape to generate frictional heat to thereby fuse said lapped tape portions and then said fused tape portions are pressed against each other to bond them together; a double-stage cam method in which a piece of heated plate is inserted between the lapped tape portions, then said tape portions are pressed against both sides of said heated plate to fuse said tape portions, and then the fused tape portions are separated from each other to remove the heated plate and then again attached to each other to bond them together; a one-stage cam method in which two pieces of heated plates are inserted between the lapped tape portions and pressed against the inner sides of said overlapped tape portions to fuse them, and then said heated plates are removed away to attach and bond the inner sides of said lapped tape portions.

Any of these known methods, however, involves complicated and time-comsuming steps and hence is low in the throughput capacity. Also, since fusion bonding of the tape portions is performed by direct pressure contact, each component part must be strong enough to endure pressure on the order of 50 to 60 Kg that may be exerted in each run. Poor heat efficiency was also unavoidable in these methods. Thus, any of the known methods had may problems that must be solved or improved.

The object of the present invention is to provide a novel method of and a novel apparatus for fusion-bonding the thermoplastic strapping tape in a strapping machine, whereby the above-said defects of the conventional systems are all eliminated and desired fusion-bonding of the tape can be accomplished with application of only a slight pressing force by easy and economical fusing and heating operations at high throughput capacity.

The conception of the present invention is featured essentially by the following ideas and arrangements. First, a heated plate is inserted between the lapped tape portions with the fore ends thereof being clamped, so as to fuse said tape portions, and then the fused lapped tape portions, with said heated plate sandwitched therebetween, are squeezedly drawn rearwardly from the fore ends thereof, thereby to bond said lapped tape portions fast together. Second, a double clamp mechanism for successively holding the leading end of the tape and the ends of the overlapped tape portions is provided with operative relation to a work plate adapted to serve as a guide for the leading tape end, and there is also provided a mechanism for pressing with a pressing means the ends of said lapped tape portions, with said heated plate being sandwiched therebetween, and displacing rearwardly said pressing means along with said heated plate while maintaining the pressed condition.

Now, the setup of the present invention is described in detail by way of an embodiment thereof with reference to the accompanying drawings.

BRIEF DESCRIPTION OF THE DRAWINGS

The drawings show an embodiment of the present invention.

Figure 1:
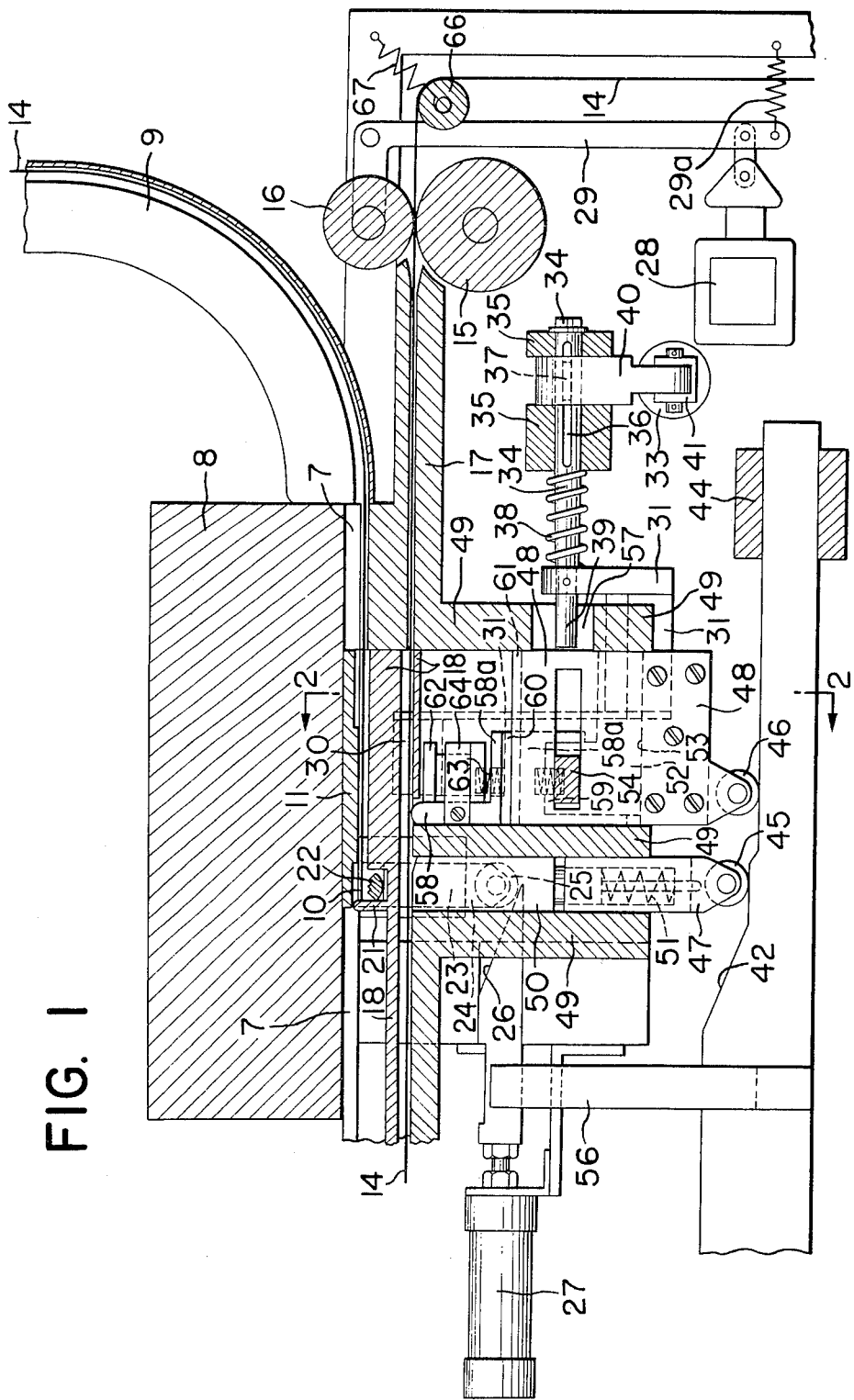
FIG. 1 is a vertical sectional front view taken along the line 1—1 of FIG. 2, showing a situation where tape feed has been completed.

Referring generally to the drawings, reference numeral 7 indicates a goods carriage on which a piece of goods (or a material, an article or anything to be packed) 8 is placed and which has formed centrally therein a slit through which a strapping tape is passed. The leading end 10 of the tape is guided along the arches 9 rising up from both ends of said slit so that said tape end 10 will be turned 360° around the goods 8 to be packed. These means are known in the art. Numeral 11 designates a work plate arranged to be movable along said goods carriage 7 by, for instance, the joint operation of an air cylinder 12 mounted on the underside of said carriage 7 and guides 13 on both sides of said air cylinder. During the forward stroke, the fore end face of said work plate is projected above the tape supply passage to constitute a guide for the upper side of the leading end 10 of the tape. It also provides a workbench for the fusion-bonding operation in cooperation with a tape clamp which is described later. Recession of said goods carriage 7 is performed when said packed goods 8 are carried out from said carriage 7.

Numeral 14 refers to a strapping tape formed from a thermoplastic resin such as for example polypropylene. It is supplied passing through between a driving roller 15 and a press roller 16, then through the fixed guide members 17 and further through a guide block 18 and further guided forward by said arches 9. Upon reaching a location just beneath the work plate 11, the leading end 10 of the tape is lapped on a tape portion in the principal part of the guide block 18. This guide block 18 is driven to move forwardly by, for instance, the joint operation of an air cylinder 19 mounted on the underside of the goods carriage 7 and a guide 20 provided therebelow. In its forward stroke, said guide block is raised up above the tape supply passage to constitute a tape guide. It is also designed to serve as a spacer for maintaining a certain fixed interval for lapping of the tape, so as to provide a situation ready for insertion of a heated plate to be described later. Numeral 21 indicates a stopper for the leading end 10 of the tape. Such stopper may be provided integral with said guide block 18.

Numeral 22 denotes a holder member for holding the leading end 10 of the tape against the surface of the work plate 11. Said holder member is supported by a support bar 24 arranged movable up and down along vertical guide member 23 provided on said work plate. Clamping and freeing of the tape leading end 10 can be effected by contacting a cam follower 25 at the bottom end of said support bar 24 with a corresponding cam bevel 26 and reciprocating said cam bevel 26 by an air cylinder 27.

Designated by numeral 28 is a solenoid which operates to separate the press roller 16 from the driving roller 15 through the medium a the bell-crank lever 29 to allow pull-back (not shown) of the tape 14. 29a indicates a return spring.

Figure 2:
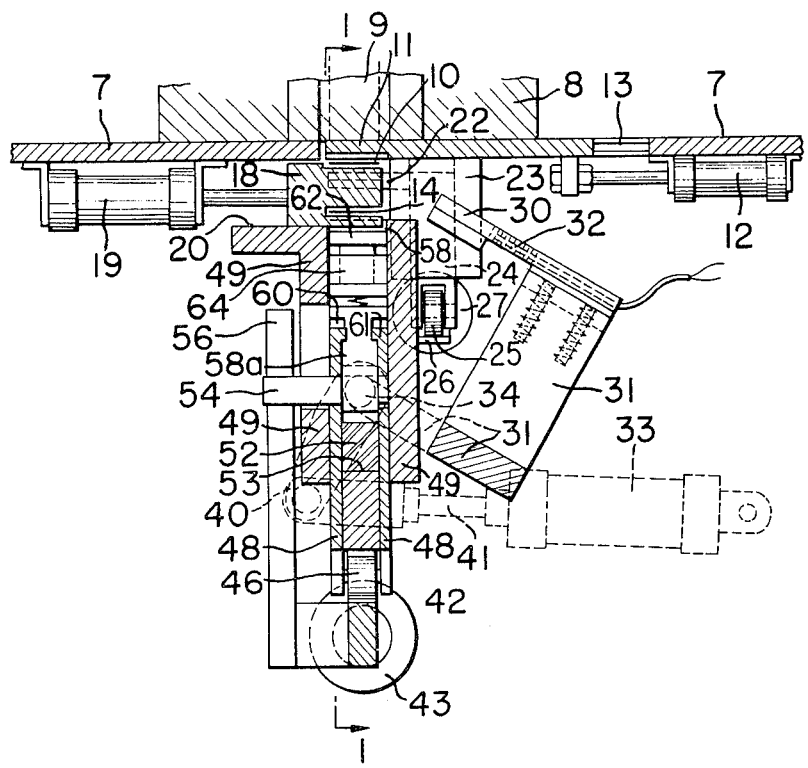
FIG. 2 is a vertical sectional side view taken along the line 2—2 of FIG. 1.
Figure 4:
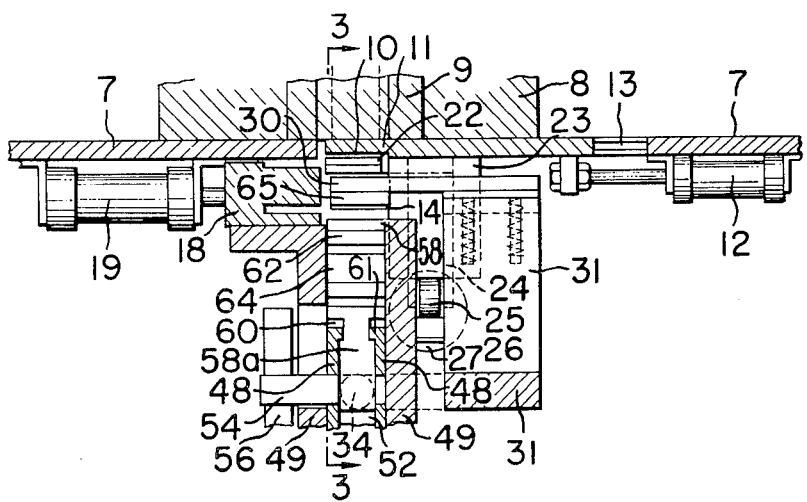
FIG. 4 is a vertical sectional front view taken along the line 4—4 of FIG. 3.
Figure 3:
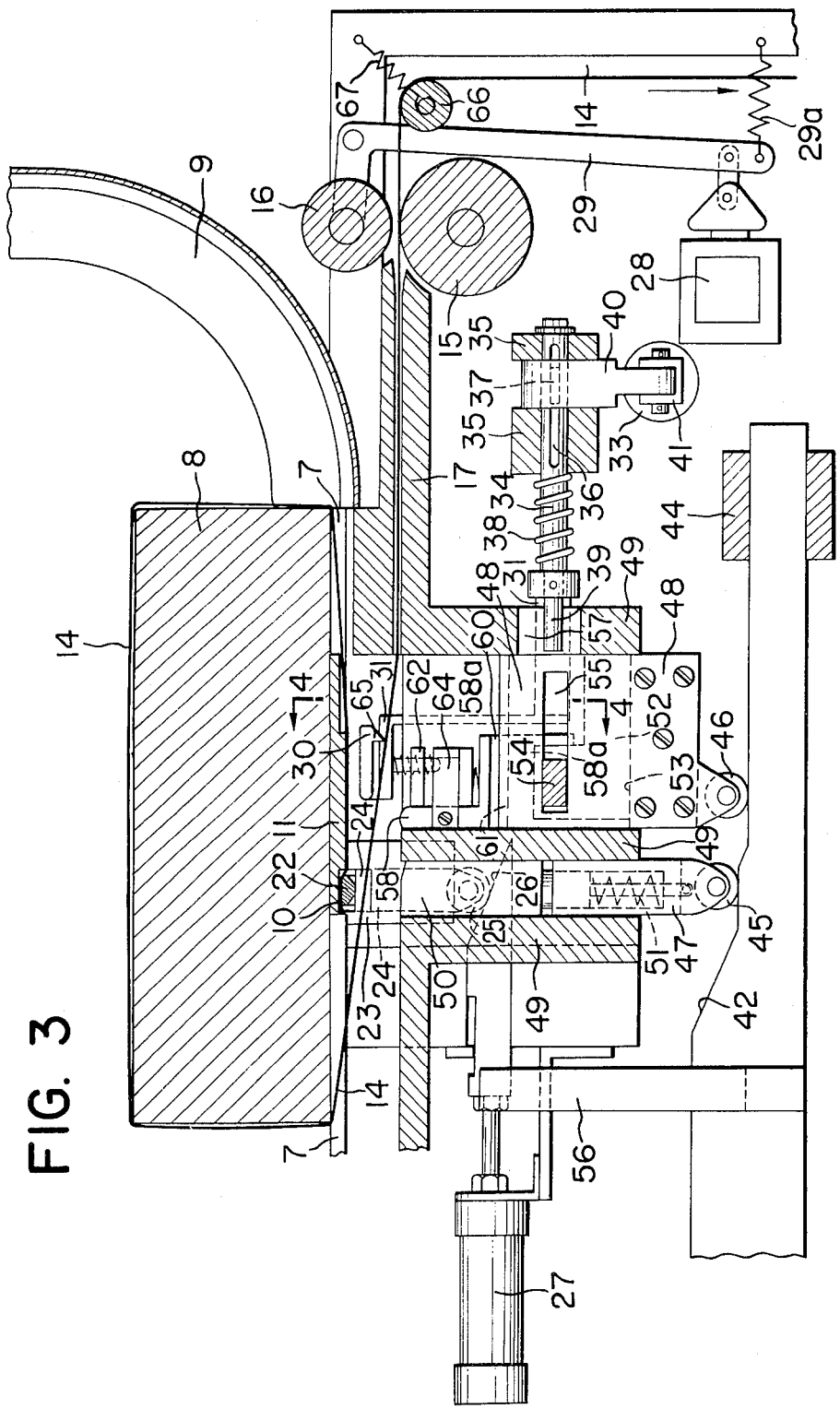
FIG. 3 is a vertical sectional front view taken along the line 3—3 of FIG. 4, showing a situation where after the leading end of the tape has been clamped, the succeeding side of the tape has been pulled back and wound around an object.

Numeral 30 refers to a heated plate arranged to be placeable between the lapped portions of the tape. It is mounted at an end of an arm 31 together with an electric heating element 32 and is arranged such that when the tape 14 is being supplied, it is placed off the tape passage by, for instance, the operation of an air cylinder 33 as shown in FIGS. 1 and 2, but when the guide block 18 recedes upon completion of the tape supply, said heated plate 30 is inserted between the lapped tape portions by, for example, the operation of the air cylinder 33 as shown in FIGS. 3 and 4. The heated plate 30 may be changed in its angular positions by a shaft 34 which is journalled in a bearing 35 and also arranged to be axially displaceable by virtue of a keyway 36 and a key 37 fitting therein. Numeral 38 indicates a return spring, 39 an axial displacement pressure receiving rod extending from one end of said shaft 34, and 40 on arm projecting from said shaft 34 and pivotted to a connecting rod 41 of the cylinder 33.

Numeral 42 denotes a reciprocating cam face which is operated by a cylinder 43 (see FIG. 2) and guided by a guide 44. 45 and 46 are a pair of cam followers which act in obedience to said cam face 42, 47 and 48 a pair of displacement transmitting block which carry said respective cam followers at the bottom ends, 49 a guide for guiding said blocks vertically, and 50 a lapped tape portion end holding member provided above said block 47 and adapted to give smoothness to the clamp by the action of a buffer spring 51. Numeral 52 indicates an L-shaped block provided in said displacement transmitting block and disposed on a horizontal guide face 53. A protuberance 54 for horizontal operation projects out from a horizontal slit 55 in said displacement transmitting block 48 to thrust into the passage of an operating bar 56 which is displaced with displacement of the cam face 43 of said protuberance 54, whereby said operating bar, when moving forwardly, is urged to move horizontally by said protuberance. In the guide 49 at the extreme right end (in the drawing) is formed a hole 57 through which the horizontal portion of said L-shaped block 52 projects out to press and displace said axial displacement pressure receiving rob 39.

58 is pressing member the end of which is preferably so shaped (in the form of a roller for example) that it can push the lapped tape portions through linear contact therewith. The base portion 58a of said push member 58 bestrides like a saddle on the vertical portion of said L-shaped metal member 52 in such a manner that it is pressed upwardly by a spring 59 (see FIG. 1), with the upward projection of said portion 58a being restricted by a jaw 61 engaged in a groove 60.

62 is a pusher which is urged upwardly along the rear side face of said pressing member 58 by the action of a spring 63 (see FIG. 1), with the neck at the middle part of said pusher being guided by a guide 64 and restricted thereby in its upward projection. Projected downwardly from the lower rear side of said heated plate 30 is a cutting edge 65 whereby the tape 14 is cut when said pusher 62 is pressed against the heated plate 30. 66 is a floating roller which is suspended down by a spring 67 which is slightly stretched out when the tape feed mechanism is in operation, whereby when the tape tension is slackened with cutting of the tape, the succeeding tape portion is pulled back into the fixed tape guide 17, thereby to prevent the tape end from being bent by hitting against a component part when the pusher guide 64 and other associated members recede.

Now, the operations of the present invention are described in regular order.

First, the work plate 11 and guide block 18 are advanced into the supply passage of the tape 14 by the operation of air cylinders 12 and 19 as shown in FIGS. 1 and 2, and then the driving roller 15 is rotated counterclockwise, whereby the tape 14 is supplied while contacted with said driving roller 15 by the press roller 16. The tape is further guided forward by the fixed guides 17, guide block 18 and arches 9 to again reach a location just below the goods 8. The tape is further advanced along the underside of the work plate 11 until its leading end 10 hits against the stopper 21, whereupon the tape supply operation is suspended.

Then, as shown in FIGS. 3 and 4, the cam bevel 26 is projected out by the action of the air cylinder 27 to let the cam follower 25 rise up, causing its integral support bar 24 to accordingly ascend along the guide member 23 until the holder member 22 provided at the upper end of said support bar 24 clamps the leading end 10 of the tape against the underside of the work plate 11. Concurrently with this clamping operation, the guide block 18 is moved back by the action of the air cylinder 19 and the solenoid 28 is energized to operate the bell-crank lever 29 so as to separate the press roller 16 from the driving roller 15 while pulling back the tape 14 by a pullback mechanism not shown, whereby the tape 14, with its leading end 10 being clamped by the holder member 22, is wound fast around the goods 8. In the meanwhile, the shaft 34 is displaced angularly through the arm 40 by the action of the air cylinder 33 so that the arm 31 extending from the end of said shaft will be raised erect, allowing the heated plate 30 disposed at the end of said arm to be inserted between the lapped portions of the tape 14.

Figure 5:
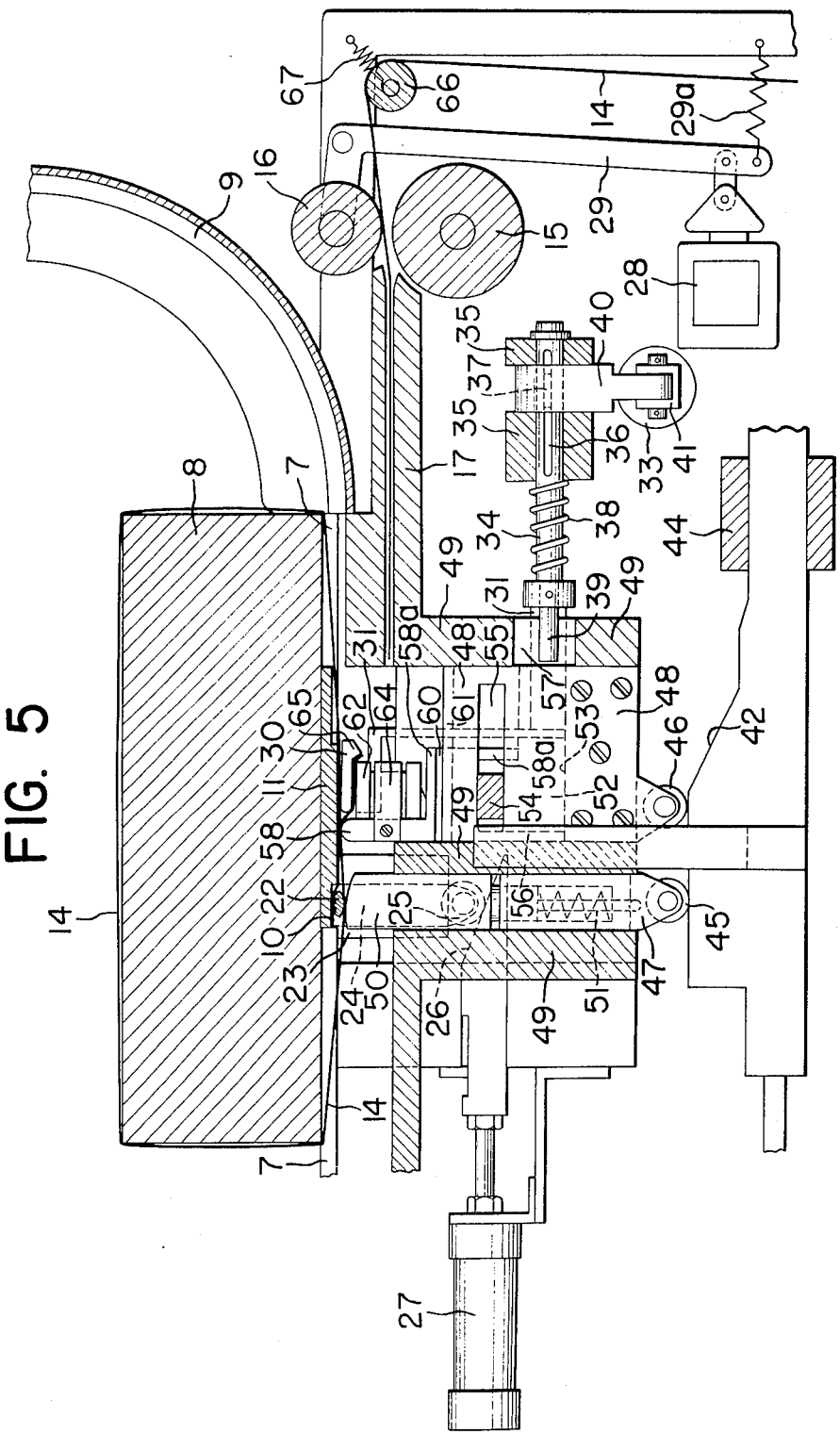
FIG. 5 is a vertical sectional front view similar to FIGS. 1 and 3, showing a situation where the end of the tape portion wound around an object, with its leading end clamped, has been further clamped and the lapped tape portions have been fused with heating.
Figure 6:
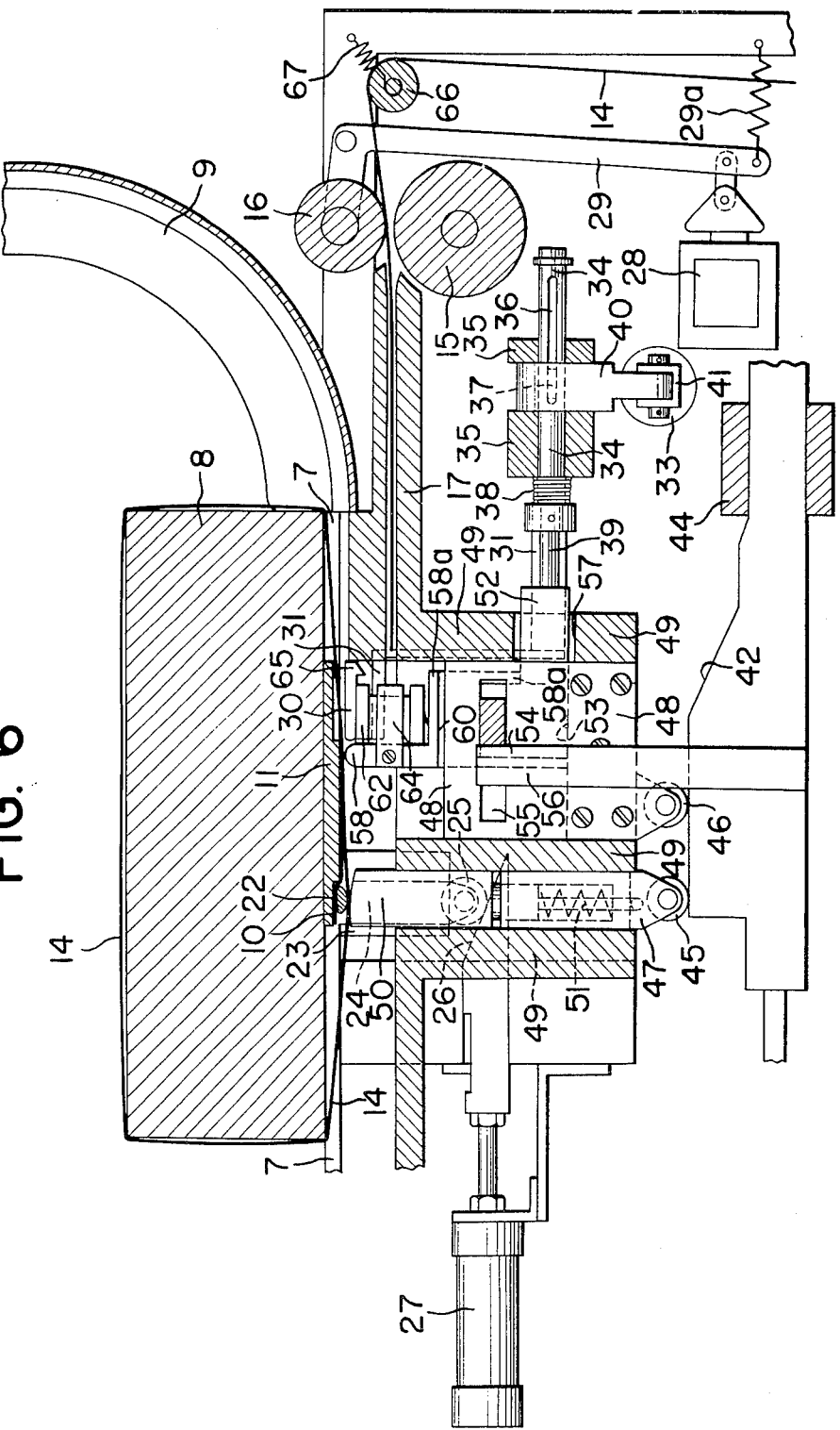
FIG. 6 is a vertical sectional front view similar to FIGS. 1, 2 and 5, showing a situation where the fused lapped tape portions have been bonded together.

Then, as shown in FIG. 5, the cam face 42 is displaced, guided by the guide 44, to the right (in the drawing) by the action of the air cylinder 43 (see FIG. 2), causing corresponding ascent first of the cam follower 45 and then of the upper end portion of the holder member 50 which is pressed upwardly by a spring 51 against the displacement transmitting block 47 integral with said cam follower, thereby to clamp the tape 14 between said cam follower 45 and said holder member 22. The cam face 42 further advances forward to raise up another cam follower 46 and this movement is conveyed through the block 48 integral with said cam follower and the L-shaped block 52 to the pressing member 58 whose base portion 58a is being pressed upwardly by spring 59 (see FIG. 1) against said block 52, so as to correspondingly raise up said pressing member 58 to press the lapped tape portions directly against the surface of the work plate 11. Simultaneously with this, said heated plate 30 is pushed up by the upper side of the pusher 62 so that the overlapped tape portions are sandwiched between the work plate 11 and heated plate 30 and also between said heated plate 30 and pusher 62 and the inner sides of said lapped tape portions are contacted with the heated plate and fused. In the meantime, as the pusher 62 is raised up, the tape 14 is pressed against and cut by the cutting edge 65, and the succeeding portion of the tape 14, which has now lost its tension, is pulled back into the fixed guides 17 by the compressive force of the spring 67 secured to the floating roller 66.

When the operating bar 56 integral with the cam face 42 moves to the right in the drawing, the protuberance 54 extending from the L-shaped block 52 through a slit 55 is pushed by said operating bar 56 to also move to the right, causing corresponding rightward movement of the L-shaped block 52 along a horizontal guide face 53, with the result that the horizontal portion of said L-shaped block 52 projects out from the hole 57 in the guide 49 and its fore end pushes the end face of the pressure receiving rod 39 extending from the angular displacing shaft 34, whereby the heated plate 30 provided at the end of the arm 31 integral with said bar 39 is pushed by the pusher 62 through said arm 31 and displaced to the right in the drawing. This rightward displacement also causes corresponding rightward displacement of the pressing member 58 which is linearly contacted with the surface of the work plate 11, so that the fused inner sides of the lapped tape portions held between said work plate 11 and pressing member 58 are drawn to the right while pressedly contacted with each and thereby fastly bonded together.

Upon completion of this fusion-bonding operation, said both work plate 11 and holder member 10 are retracted by the action of the air cylinder 12 while the fusion-bonded portion of the tape contacts the underside of the goods 8 to have it ready for transfer. Then the cam face 42 and the operating bar 56 are returned to the positions shown in FIG. 1 by the action of the cylinder 43 (see FIG. 2), allowing the L-shaped block 52, pressing member 58 and pusher 52 to also return to their original positions. On the other hand, as the spring 38 is allowed to stretch out with recession of the L-shaped block 52, the heated plate 30 is displaced to the left in obedience to leftward displacement of the arm 31 and held at a location off the tape supply passage by the action of the air cylinder 33. After the holder members 22 and 50 have been returned to their original positions by the action of the air cylinders 27 and 43 (see FIG. 2), respectively, the work plate 11 and guide block 18 are again moved into the tape supply passage by the operation of the respective air cylinders 12 and 19 and also the solenoid 28 is energized to completely restore the condition of FIG. 1. Thereafter, the above-said operations are repeated to continue the strapping works.

Thus, as discussed hereabove, the present invention has developed quite a novel fusion-bonding system in which the desired fusion-bonding is accomplished by using pressure provided through linear contact and by drawing the linearly contacted portion rearwardly, that is, displacing said portion rearwardly while keeping it in a pressed state, so that according to this method, satisfactory fusion-bonding can be effected with application of a small pressure, or about one-tenth that required in the conventional planar contact pressure fusion-bonding systems. This enables realization of reduction of size and weight as well as speed-up of the operations and also provides many merits in handling and transportation. Further, the fusion-bonding operation is more refined and economical than the conventional systems, and also the heat treatment can be accomplished with ease and quickly. Thus, the present invention provides great benefits in performance of strapping works.

What is claimed is:

1. A device for fusion bonding together the overlapping portions of a thermoplastic strapping tape disposed around an article comprising means for clamping together the leading end of said tape and the overlapping trailing portion thereof in a fixed position with respect to the article, means for heating the overlapping portions of the tape to the fusion temperature of said thermoplastic tape, means for inserting said heating means between the overlapping portions of the tape adjacent the clamping means, means for exerting pressure against the overlapping portions of the tape along a line transversely of said portions of the tape and disposed between the clamping means and said heating means when said heating means is inserted between the overlapping portions of the tape, means for cutting the outer trailing portion of the tape to provide a trailing end of the tape, and means for moving said heating means and said pressure exerting means simultaneously longitudinally of said tape toward the trailing end of said tape whereby the overlapping portions of the tape are progressively heated and substantially immediately thereafter pressed together to form a secure bond between the overlapping portions of the tape.

* * * * *